US009563417B2

(12) United States Patent
Jha et al.

(10) Patent No.: US 9,563,417 B2
(45) Date of Patent: Feb. 7, 2017

(54) PATCH MANAGEMENT AUTOMATION TOOL FOR UNIX, APARXML

(75) Inventors: Sanjeev Jha, Acton, MA (US); Matthew P. Jarvis, Burlington, MA (US); Donny R. Rota, Leominster, MA (US)

(73) Assignee: International Business Machines Corporation, Armonk, NY (US)

( * ) Notice: Subject to any disclaimer, the term of this patent is extended or adjusted under 35 U.S.C. 154(b) by 1482 days.

(21) Appl. No.: 11/618,712

(22) Filed: Dec. 29, 2006

(65) Prior Publication Data
US 2008/0163192 A1   Jul. 3, 2008

(51) Int. Cl.
G06F 9/44 (2006.01)
G06F 9/445 (2006.01)
(52) U.S. Cl.
CPC ........................ G06F 8/65 (2013.01)
(58) Field of Classification Search
CPC ................... G06F 8/65; G06F 8/61
(Continued)

(56) References Cited

U.S. PATENT DOCUMENTS 6,338,149 B1   1/2002   Ciccone, Jr. et al.
6,363,524 B1   3/2002   Loy
(Continued)

FOREIGN PATENT DOCUMENTS

CN   1777867 A       5/2006
WO   2004/086168 A2  10/2004

OTHER PUBLICATIONS

Microsoft Computer Dictionary Fifth Edition, © 2002. p. 102.*

Primary Examiner — Anna Deng
(74) Attorney, Agent, or Firm — Ryan Lewis; Hoffman Warnick LLC

(57) ABSTRACT

The present invention provides a common framework to determine if machines are patched and automatically applies patches as required. It provides an automated tool to assess patch levels and apply patches on several different UNIX machine types. Further, it provides a centralized, consistent method of providing patches to multiple roles within an organization while automatically managing large quantities of machines. It can manage multiple security standards, machine classifications, and patch security levels and be customized to interface with existing asset management tools. It evaluates the most suitable patch to satisfy the minimal patch requirements and is an early warning system that will tell a user when the user's machine will go out of compliance. The tool is composed of two parts: a server component and client component. The server collects data reported by client machines and stores it in a database; collects patch, machine and owner data from other databases, including internal databases and vendor web sites; downloads vendor patches to a depot area; and evaluates compliance and generates a list of patches that are missing, applied late, and patches that are satisfied. An overall compliance verdict is calculated for each machine. The server sends the client a list of patches to be installed as needed. The server receives installation status from the client, reports it onto the web, and sends the user email. The client gathers machine data and sends it to server; queries the server to see if patches are needed, and receives a patch list. The client downloads patches from APAR depot; and installs patches and reports status back to the server.

12 Claims, 3 Drawing Sheets

(58) Field of Classification Search
USPC .......................................................... 717/173
See application file for complete search history.

(56) References Cited

U.S. PATENT DOCUMENTS

| | | |
|---|---|---|
| 6,477,703 B1 | 11/2002 | Smith et al. |
| 6,763,517 B2 | 7/2004 | Hines |
| 6,954,928 B2 | 10/2005 | Allsop et al. |
| 6,990,660 B2 | 1/2006 | Moshir et al. |
| 7,007,274 B1 * | 2/2006 | Patel et al. ................... 717/176 |
| 7,757,227 B2 * | 7/2010 | Duplessis et al. ............ 717/173 |
| 2003/0195951 A1 * | 10/2003 | Wittel et al. .................. 709/220 |
| 2004/0167906 A1 | 8/2004 | Smith et al. |
| 2005/0132382 A1 | 6/2005 | McGuire et al. |
| 2005/0144591 A1 * | 6/2005 | Banks ........................... 717/122 |
| 2005/0216906 A1 * | 9/2005 | Shahindoust et al. ........ 717/171 |
| 2006/0037013 A1 * | 2/2006 | Kang ............................. 717/168 |
| 2006/0080656 A1 * | 4/2006 | Cain et al. .................... 717/174 |
| 2006/0130047 A1 * | 6/2006 | Burugapalli .................. 717/170 |
| 2006/0212865 A1 * | 9/2006 | Vincent et al. ............... 717/168 |
| 2006/0242157 A1 * | 10/2006 | McCuller ........................ 707/10 |
| 2008/0184225 A1 * | 7/2008 | Fitzgerald et al. ............... 718/1 |

\* cited by examiner

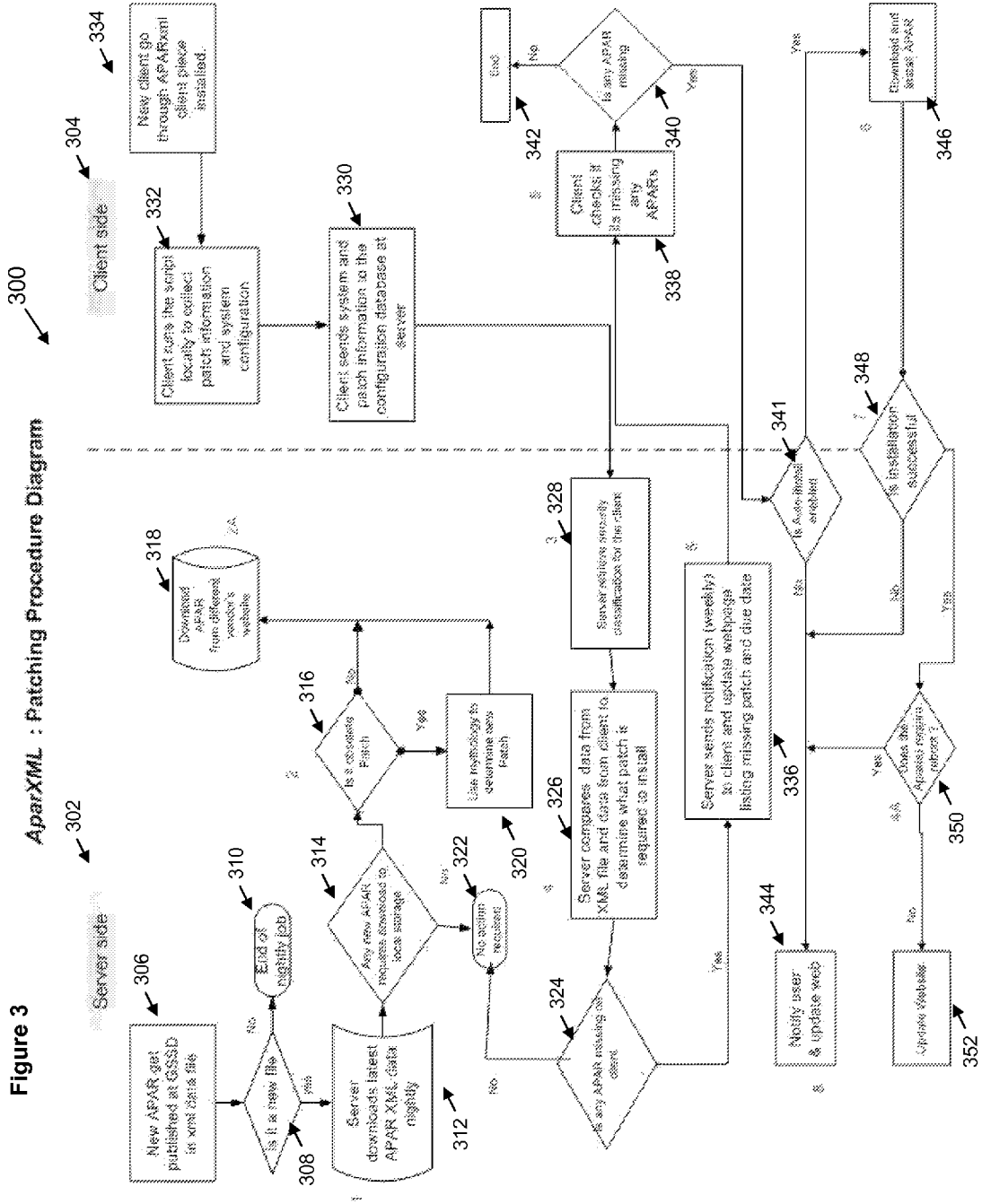

PATCH MANAGEMENT AUTOMATION TOOL FOR UNIX, APARXML

FIELD OF THE INVENTION

The present invention relates generally to software analysis tools and, more specifically, to improvements to runtime analysis tools for providing insight into certain forms of software misbehavior.

BACKGROUND OF THE INVENTION

In computing, a patch is a small piece of software designed to update or fix problems with a computer program. This includes fixing bugs, replacing graphics and improving the usability or performance. Though meant to fix problems, poorly designed patches can sometimes introduce new problems (aka. software regressions).

Patch management is the process of using a strategy and plan of what patches should be applied to which systems at a specified time.

However, there is no common way to determine if many UNIX machines are patched to meet compliance standards. There is no common set of commands and tools to patch multiple UNIX machines automatically. Each UNIX Operating System type (Solaris, HP-UX, AIX, RedHat Linux, SuSE Linux) has a different way to evaluate patch information, patch history and a different way to install the patch. This makes maintaining compliance with security standards a complex and labor-intensive task and requires experts for each machine type.

With current technology, the patching of UNIX systems is inconsistent and a potentially error prone manual process. FIG. 1 illustrates the current manual process used. At 102, a new APAR is released. (APAR (Authorized Program Analysis Report)) is a request for correction of a defect. In the present application, an APAR is a patch. At 104, a determination is made as to whether the APAR is applicable to the system. If not, at 106, the APAR is closed. If so, at 108, the APAR is searched and downloaded and, at 110, the APAR is installed and, at 106, the APAR is closed. This is a time consuming process to monitor and manage patching.

In view of the foregoing, a need exists to overcome these problems by providing a system and method for monitoring and managing the patch process.

BRIEF SUMMARY OF THE INVENTION

The present invention provides a common framework to determine if machines are patched and automatically applies patches as required. It provides an automated tool to assess patch levels and apply patches on several different UNIX machine types. The present invention offers many advantages. The use of this automated tool saves the cost of unnecessary machine maintenance and reboots. It traverses the vendor's list of all possible compliant patch solutions for the user's machine and determines if the user's machine already contains any of the patches that would make it compliant. This key optimization saves administrators from searching through possibly thousands of patch descriptions. Or worse, bringing down machines and unnecessarily applying patches.

In addition, it saves the cost of hiring a system administrator for a given set of UNIX machines and governs asset compliance. Further, it provides a centralized, consistent method of providing patches to multiple roles within an organization while automatically managing large quantities of machines. It can manage multiple security standards, machine classifications, and patch security levels and be customized to interface with existing asset management tools. It evaluates the most suitable patch to satisfy the minimal patch requirements and is an early warning system that will tell the user when the user's machine will go out of compliance. The present invention provides a common framework to determine if machines are patched and automatically applies patches as required. It provides an automated tool to assess patch levels and apply patches on several different UNIX machine types. Further, it provides a centralized, consistent method of providing patches to multiple roles within an organization while automatically managing large quantities of machines. It can manage multiple security standards, machine classifications, and patch security levels and be be customized to interface with existing asset management tools. It evaluates the most suitable patch to satisfy the minimal patch requirements and is an early warning system that will tell a user when the user's machine will go out of compliance. The tool is composed of two parts a server component and client component. The server collects data reported by client machines and stores it in a database; collects patch, machine and owner data from other databases, including internal databases and vendor web sites; downloads vendor patches to a depot area; and evaluates compliance and generates a list of patches that are missing, applied late, and patches that are satisfied. An overall compliance verdict is calculated for each machine. The server sends the client a list of patches to be installed as needed. The server receives installation status from the client, reports it onto the web, and sends the user email. The client gathers machine data and sends it to server; queries the server to see if patches are needed, and receives a patch list. The client downloads patches from APAR depot; and installs patches and reports status back to the server.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 3 is a depiction of the patch procedure diagram of the present invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

Figure 1:
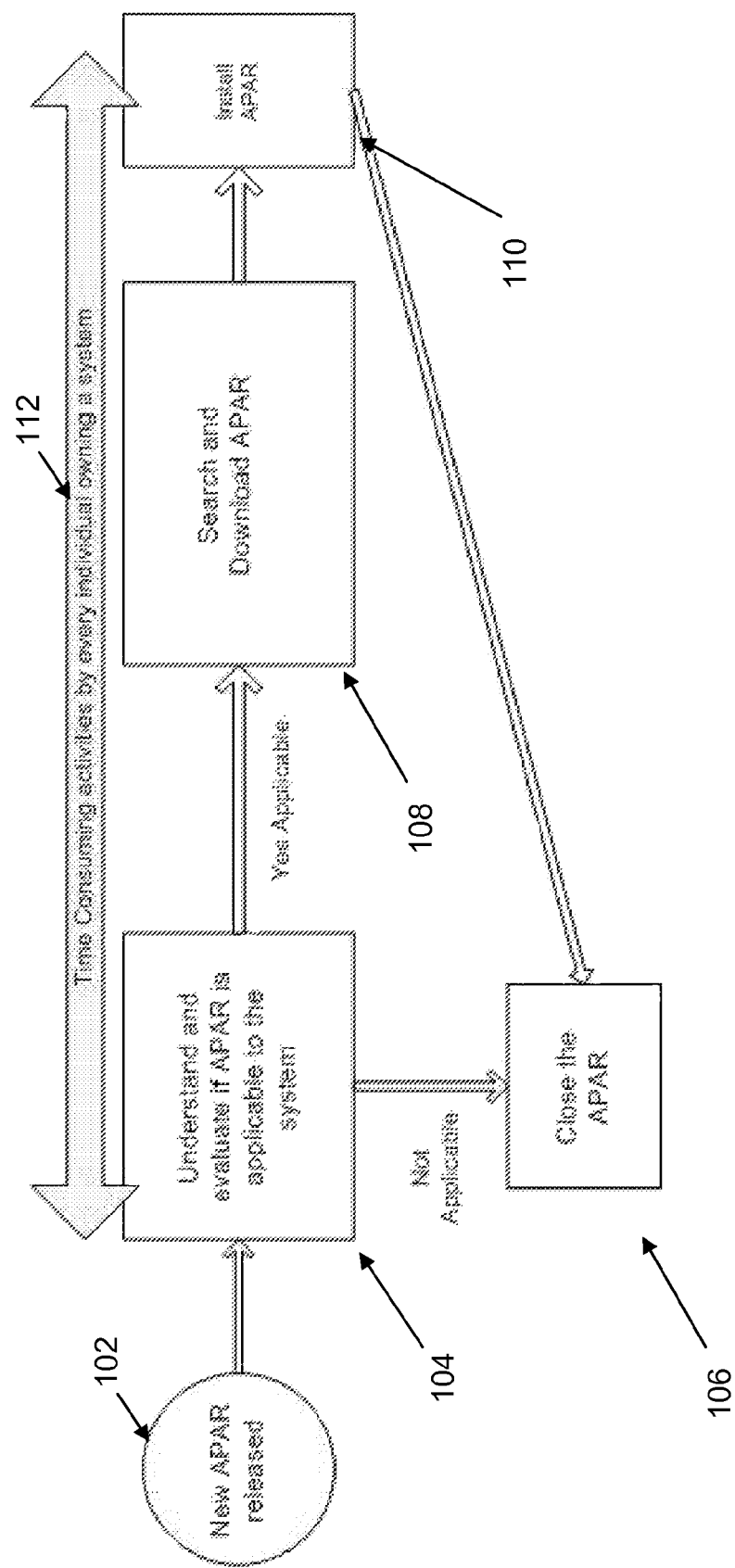
FIG. 1 is a depiction of a method of patch management of the prior art.
Figure 2:
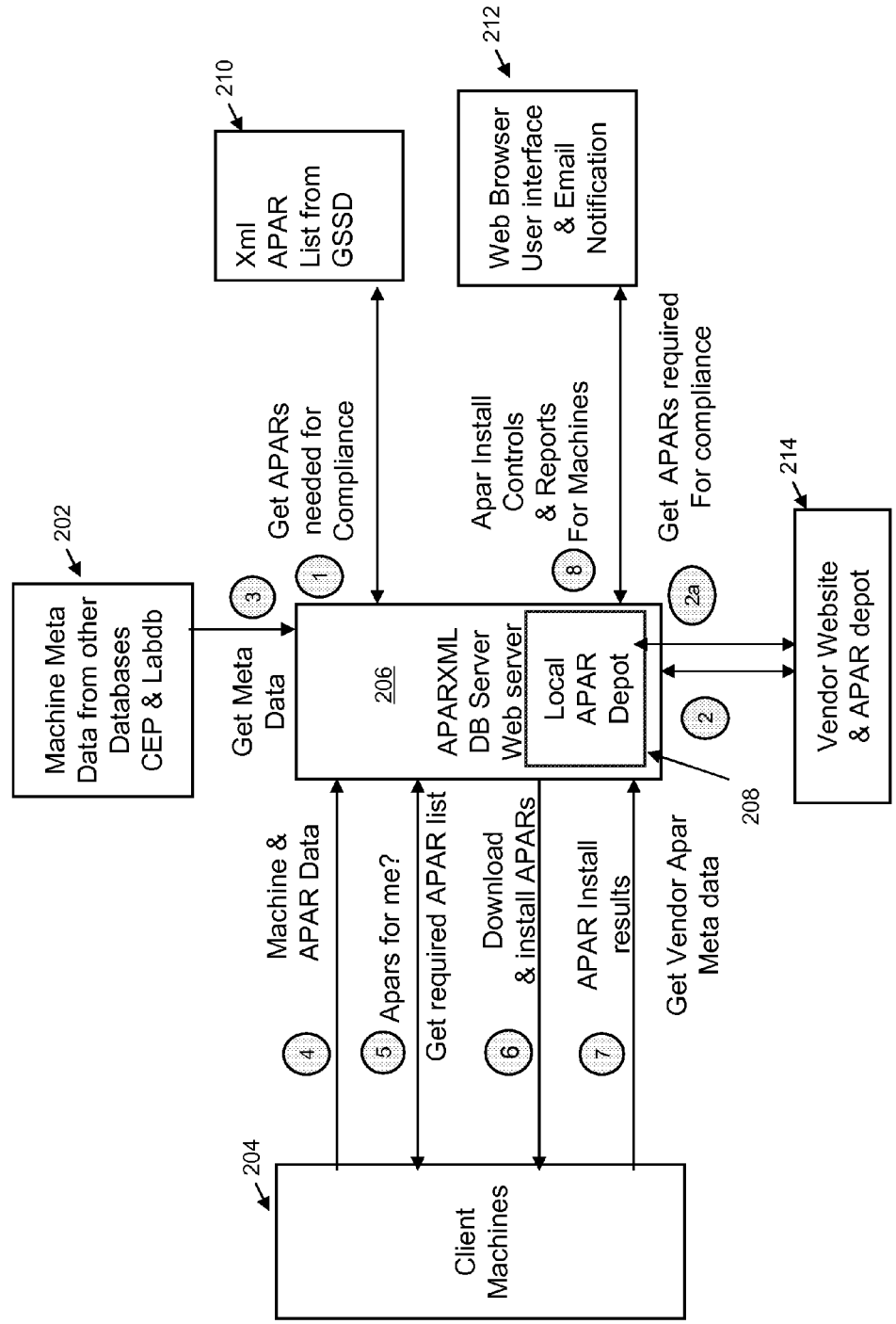
FIG. 2 is a depiction of the component flow diagram of the present invention.

The tool is composed of two parts, a server component and client component:

Overview of Server Functionality:

- The server collects data reported by client machines and stores it in a database (FIG. 2, step 4).
- The server collects patch, machine and owner data from other databases, including internal databases and vendor web sites (FIG. 2, step 1; FIG. 3, step 312).
- The server downloads vendor patches to a depot area (FIG. 2, steps 2, 2A; FIG. 3, step 318).
- The server evaluates compliance and generates a list of patches that are missing, applied late, and patches that are satisfied. An overall compliance verdict is calculated for each machine. (FIG. 3, steps 324, 326)
- The server provides a web interface for the users to specify how to update their machines and get notified. (FIG. 2, block 212)
- The server sends the client a list of patches to be installed as needed. (FIG. 2, step 5; FIG. 3, step 336)
- The server receives installation status from the client, reports it onto the web, and sends the user email. (FIG. 2, steps 7, 8; FIG. 3, steps 344, 348)

Overview of Client Functionality:

- The client gathers machine data and sends it to server. This includes, operating system name, version, hostname, IP address, MAC address, uptime, patch or package names, patch versions, and install dates. (FIG. 2, step 4; FIG. 3, step 332, 330)
- The client queries the server to see if patches are needed, and receives a patch list. (FIG. 2, step 5; FIG. 3, step 338, 340)
- The client downloads patches from APAR depot. (FIG. 2, step 6; FIG. 3, step 346)
- The client Installs patches and reports status back to the server. (FIG. 2, step 7; FIG. 3, step 346)
- These tasks run as scheduled daily events. (FIG. 3, step 312)

FIG. 2 illustrates the component data work flows. XML APAR list from GSSD 210 passes "Get APARs needed for Compliance Request 1 to APARXML DB Server Web Server 206. ("XML" is "Extensible Markup Language, File format, contains APAR information." "GSSD" is Global Security Services Delivery website.) APARXML DB Server Web Server 206, which comprises Local APAR Depot 208, passes "Get APARs needed for Compliance Request" 2 and 2a to Vendor Website & APAR Depot 214. Machine Meta Data from other databases CEP & Labdb 202 passes "Get Meta Data" request 3 to APARXML DB Server Web Server 206. "CEP" is Computing Equipment Profile, a security management tool while "Labdb" is Lab asset management tool. Client Machines 204 passes Machine and APAR Data 4 to APARXML DB Server Web Server 206. Client Machines 204 passes APARS for Me? Request and Get Required APAR List Command 5 to APARXML DB Server Web Server 206. APARXML DB Server Web Server 206 downloads and installs APARS to Client Machines at 6. Client Machines 204 send APAR Install Results and Gets Vendor APAR Meta Data at 7. Web Browser User Interface & Email Notification 212 passes APAR Install Controls & Reports for Machines 8 to APARXML DB Server Web Server 206.

FIG. 3 illustrates the Patch Procedure. The procedure 300 is divided into server-side 302 and client-side 304. Beginning with the server side, at 306, the server determines that a new APAR got published at the GSSD in an XML data file. At 308, the server determines whether the APAR is new and, if not, at 310, the nightly job ends. If so, at 312, server downloads the APAR XML data nightly. At 314, the server determines whether a new APAR requires download to local storage. If not, at 322, no action is taken. If so, at 316, the server determines whether it is an obsolete APAR. If not, at 318, the server downloads the APAR from a different vendor's website. If so, at 320, the server uses mythology to determine new patch. (This will be discussed in further detail below.)

On the client side 304, at 334, a new client goes through APARXML client piece installed. At 332, the client runs the script locally to collect patch information and system configuration and at 330, sends the collected patch information and system configuration to configuration database at the server. At 328, the server collects the security information for the client. At 326, the server compares the data from the XML file and data from client to determine what patch is required to install. At 324, the server determines whether any APAR is missing on the client and, if not, 322, no action is taken. If so, at 336, the server sends notification (weekly) to client and update webpage listing missing patch and due date. At 338, the client checks if it is missing any APARs and, if no, procedure ends at 342. If so, at 342, server determines whether autoinstall is enabled and, if not, at 344, the server notifies the user and updates the web. If the autoinstall is enabled, at 346, the client downloads and installs the APAR. At 348, the server determines from the client whether the installation was successful and, if not, the server notifies the user and updates the web. If so, the server determines whether the APAR needs to reboot. If yes, the server notifies the user and updates the web at 346. If no, the server updates the web at 352.

Detailed Description of the Implementation:

Step 1:

The first requirement of the system is to get a list of required patches or packages (called APARs). This is shown in FIG. 2, step 4 and FIG. 3, steps 306, 308, 312. This information is obtained from a set of XML files (one for each platform) that are downloaded from a server. For some platforms, the XML files provide a patch number. For other platforms, the XML files provide a required package name and package version. The severity of the APAR and the release date of the APAR are also included in the XML files. This information is parsed and entered into the database.

In order to properly determine which patches satisfy a particular requirement, it is necessary to gather data about patch history. That is, the primary server must know all the patches that have been released that supersede the required patches and in what order they were released. The way in which this information is calculated differs for each platform.

RedHat and SuSE have a package versioning scheme where version numbers are separated, first by dashes (-), then by periods (.), and finally by letters (a-z). Version numbers are compared using this hierarchy and any package version greater than or equal to the required version satisfies the requirement.

AIX has a simpler versioning scheme. Version numbers are simply separated by periods (.). Version numbers are compared using this breakdown, and again, any package version greater than or equal to the required version satisfies the requirement.

Sun patches are identified by a six-digit number followed by a dash, followed by a two-digit revision number. Patches with the same six-digit identification number can be compared simply by comparing the revision numbers. A patch satisfies a requirement if the patch identification numbers are the same and the installed revision number is greater than the required revision number. However, there are instances where a patch is superseded by another patch with a completely different six-digit identification number. In this case, since it is not able to determine the relationships based solely on the patch numbers, the tool retrieves information from Sun's patch information website. When looking up information on a particular patch, information is provided on the current status of the patch (active or obsolete), and if the patch is obsolete, the next patch in line is listed. A chain of patches from the required patch to the best patch is constructed simply by following the information on the Sun website from one patch to the next.

HP patches are identified by a set of four letters followed by an underscore (), followed by a five-digit number. The patch numbers assigned to patches by HP contain no information about one patch superseding another. All of this information must be gathered from the HP website. However, HP presents information about obsolete patches differently than Sun does. When requesting information about a patch on the HP website, the best patch is listed along with a set (in no particular order) of patches that were obsoleted by this patch. There is no information about which patches fall between the best patch and the patch being queried on (which is the information needed). However, the chain between the required patch and the best patch can be reconstructed using the following algorithm:

Preconditions:
Patch p is required on a machine
Define a function S on a patch x where S(x) equals the set of patches superseded by patch x. This information is available on the HP website.
Define a function B(x) on a patch x where B(x) equals the best patch that supersedes x. This information is available on the HP website.

Algorithm:
Let patch b equal B(p)
Define a set D=S(p)+{p}. These are the patches that cannot fall between patch p and patch b.
Define a set C=S(b)−D. This is the set of candidates that could fall between patch p and patch b.
Let D=D+{c} for all c in C where S(c) does not contain p.
Let C=C−D. Set C now contains only patches that fall between p and b. We must now determine what order those patches fall in.
Define an associative array A where A[c]=S(c)−D for all patches c in C.
Sort the indices of array A in ascending order by the number of elements in A[c], and store the result in the ordered set R.

Post-Condition:
The chain of patches from the required patch to the best patch is equal to patch p, followed by the elements of set R in order, followed by patch b.

Certain installation requirements are gathered from the Sun and HP websites. For example, certain patches require a reboot after installation, while others require a service to be reconfigured. This information is also captured and stored in the database.

Step 2a

Using the information gathered in STEP 2, a list of patches or packages can be generated that might need to be installed on a machine. Using this list, these patches are automatically retrieved from the vendor websites and are stored in a local patch depot. During automated installations, clients will be able to pull their patches from the local depot instead of the vendor website, reducing charges for external internet traffic.

Step 3

Reporting requires that the server is able to associate machines with their owners. The server also needs to know the security class of each machine in order to determine which APARs are required and when they are coming due on the machines. This information is gathered from another database which already stores this information (CEP).

Step 4

Clients are configured to report their status to the server daily. Each machine runs a script gathers information about the machine's configuration. Some of the information gathered includes patches or packages installed, operating system, hostname, IP address, MAC address, and uptime. This information is sent to the server along with a unique client ID that is stored on the machine. If the unique client ID does not exist, the server knows this is a new machine reporting in, and it assigns a unique ID to the client. This unique ID is used by the server to determine if it should create a new record with the information it receives or if it should update an existing record.

After the server receives a status report from the client, it recalculates which APARs are required on the machine and when those APARs are due. This is calculated based on the machine's operating system, security class, and architecture. Using the patch information gathered during STEP 2, it is determined if any of the patches or packages that are installed on the machine satisfy the required APARs. Using this information, the server is able to generate reports on which APARs are satisfied, when they were satisfied, and by what patch or package. The server is also able to generate a list of APARs that are missing and need to be installed.

Step 5

The clients are also configured to query the server daily and ask if there are any patches that should be automatically installed. Based on the missing APARs and the user's preferences (see STEP 8) for that particular machine, the server generates a list of patches or packages that should be automatically installed. This list is then sent back to the client.

Step 6

Given the list of patches or packages that are to be automatically installed, the clients automatically retrieve the files for these patches or packages from the APAR depot on the server. After retrieving the files, the client automatically installs each of the required patches or packages. The client tracks the status of each patch or package installation throughout the process.

Step 7

The install results are then reported into the server. For each patch or package, the client can report back to the server:
Success—the patch or package was installed successfully
Failure—the patch or package failed to install
Not Applicable—the patch or package doesn't apply to this system Along with each status, details are included so owners can handle any problems that may occur with automated installation. The server records the status of the installations and prepares reports to be sent to the machine owner.

Step 8
    Users can setup e-mail preferences:
    Send me e-mail with a weekly status report
    Send me e-mail when I have patches due in less than 15 days
    For each machine, the owner of the machine has four options of what is automatically installed on their machine:
        Automatically install all missing patches (even if they aren't required for this security class).
        Automatically install all required patches
        Automatically install only those patches that I flag on the interface
        Never automatically install anything As can be seen from the foregoing, a need exists to overcome the problems of monitoring and managing the patch process and the system and method of the present invention solves these problems.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A tool for use in a system having at least one processor, at least one server, at least one client, and databases including internal databases and vendor web sites, the databases having vendor patches, the tool for monitoring and managing patches on clients to determine if clients are patched and automatically applying patches in response to determining the patches are required, the tool comprising:
    a server component located on the server; and
    a client component located on the client and separated from the server,
    the server component performing actions including:
        collecting data reported by clients;
        collecting patch data from the databases, the patch data in the form of an XML data file;
        downloading vendor patches in response to determining that the vendor patches are not present at the server; evaluating compliance from the client;
        sending each client a list of patches to be automatically installed in response to receiving a query from each client for any automatically installed patches on a daily basis; and
        updating at least one of the vendor websites to indicate the list of patches not yet installed on the client;
        wherein the evaluating of the compliance from the client includes comparing the patch data in the XML data file with machine data from the client;
    the client component performing actions including:
        gathering the machine data and sending the machine data to the server component;
        receiving from the server component the list of patches to be automatically installed;
        downloading and installing the patches listed in the list of patches; and
        sending an installation status to the server,
        wherein the server component, in response to the client component sending the installation status, performs actions including:
            receiving the installation status from the client component; reporting the installation status onto at least one of the vendor websites; and
            sending the client an email including the installation status, wherein the server component further includes:
                an evaluating component for, upon receiving a required patch from a vendor for the client, evaluating a most suitable patch to satisfy minimal patch requirements of the vendor, the evaluating component including:
                    a component for gathering a list of all patches that have been released by the vendor that supersede the required patch and in what order they were released;
                    a component for determining whether the required patch is active or obsolete;
                    a component for, if the required patch is obsolete, examining a next patch in the list of all patches; and
                    a component for examining a chain of patches from the required patch to a best patch by following information on the website from one patch to the next patch in the chain of patches.

2. The tool of claim 1 wherein the client component queries the server component to see if patches are needed.

3. The tool of claim 1 wherein the database data further includes machine and owner data.

4. The tool of claim 1 wherein the server component downloads the vendor patches to a depot area and the client component downloads the vendor patches from the depot area after the server component performs the downloading of the vendor patches.

5. The tool of claim 1 wherein the server component determines a most suitable patch to satisfy predetermined patch requirements.

6. The tool of claim 5 wherein the server component provides an early warning to the client when the client will go out of compliance.

7. A computer program product in a non-transitory computer readable medium having a method thereon for operating in a system having at least one server, at least one client separated from the server, and databases including internal databases and vendor web sites, the databases having vendor patches, the method for monitoring and managing patches on clients to determine if clients are patched and automatically applying patches in response to determining the patches are required, the method comprising:
    at the server separated from the client:
        collecting data reported by clients;
        collecting patch data from the databases; the patch data in the form of an XML data file;
        downloading vendor patches in response to determining that the vendor patches are not present at the server;
        evaluating compliance from the client; and
        sending each client a list of patches to be automatically installed in response to receiving a query from each client for any automatically installed patches on a daily basis;
        updating at least one of the vendor websites to indicate the list of patches not yet installed on the client,
        wherein the evaluating of the compliance from the client includes comparing the patch data in the XML data file with machine data from the client;
    at each client:
        gathering the machine data and sending the machine data to the server;
        receiving from the server the list of patches to be automatically installed;

downloading and installing the patches listed in the list of patches; and sending an installation status to the server,
  wherein in response to each of the clients sending the installation status, at the server:
    receiving the installation status from the clients;
    reporting the installation status onto at least one of the vendor websites; and
    sending the client an email including the installation status,
  wherein, at the server:
    upon receiving a required patch from a vendor for the client, evaluating a most suitable patch to satisfy minimal patch requirements of the vendor, the evaluating including:
      gathering a list of all patches that have been released by the vendor that supersede the required patch and in what order they were released;
      determining whether the required patch is active or obsolete;
      if the required patch is obsolete, examining a next patch in the list of all patches; and
      examining a chain of patches from the required patch to a best patch by following information on the website from one patch to the next patch in the chain of patches.

8. The computer program product of claim 7 further including, at each client, querying the server to see whether any of the list of patches are needed.

9. The computer program product of claim 7 wherein the database data further includes machine and owner data.

10. The computer program product of claim 7 further including, at the server, downloading the vendor patches to a depot area and, at the client, downloading the vendor patches from the depot area after the downloading of the vendor patches to the depot area.

11. The computer program product of claim 7 further performing, at the server, determining a most suitable patch to satisfy predetermined patch requirements.

12. The computer program product of claim 11 further performing, at the server, providing an early warning to the client when the client will go out of compliance.

\* \* \* \* \*